United States Patent

Geka et al.

Patent Number: 5,785,155
Date of Patent: Jul. 28, 1998

[54] LINEAR MOTION CLAMPING UNIT

[75] Inventors: Toshiaki Geka, Kamakura; Kazunari Shibazaki, Numazu, both of Japan

[73] Assignee: Nippon Thompson Co., Ltd., Tokyo, Japan

[21] Appl. No.: 723,042

[22] Filed: Sep. 30, 1996

[30] Foreign Application Priority Data

Nov. 22, 1995 [JP] Japan .................. 7-326228

[51] Int. Cl.⁶ ........................................ F16C 29/06
[52] U.S. Cl. ...................... 188/41; 188/43; 384/45
[58] Field of Search .................... 188/67, 38, 41, 188/43, 36

[56] References Cited

U.S. PATENT DOCUMENTS

| | | | |
|---|---|---|---|
| 870,305 | 11/1907 | Moore | 188/43 |
| 4,538,706 | 9/1985 | Koppensteiner | 188/41 |
| 5,460,452 | 10/1995 | Hara | 384/45 |

*Primary Examiner*—Matthew C. Graham
*Attorney, Agent, or Firm*—Browdy and Neimark

[57] ABSTRACT

The present invention provides a linear motion clamping unit capable of reliably holding the casing unit at an arbitrary position on the track rail with a small force. In this linear motion clamping unit, when the actuators are deenergized, the rollers arranged in the openings of the retainers are pushed by the spring force through the retainers to engage with the lock portions formed between the inclined surfaces of the wedge members and the side wall surfaces of the track rail. The resulting wedge action locks the casing unit on the track rail in one axial direction. When the actuators are energized, the rollers are released from the lock portions by the action of the retainers, thus unlocking the casing unit.

9 Claims, 4 Drawing Sheets

LINEAR MOTION CLAMPING UNIT

BACKGROUND OF THE INVENTION

1. Field of the Invention

The present invention relates to a linear motion clamping unit to hold at an appropriate position on a track rail a linear motion rolling guide unit applied to a variety of equipment such as machine tools, industrial robots and semiconductor manufacturing equipment.

2. Description of the Prior Art

A conventional linear motion rolling guide unit comprises a track rail securely mounted on a bed and having raceway grooves extending virtually longitudinally on both sidewall surfaces thereof; and a slider secured to a table and mounted astride the track rail, with rolling members such as balls interposed therebetween, so that the slider can slide on the track rail.

In performing work and operations on the table, the table needs to be locked at an appropriate position on the track rail fixedly mounted on the bed. For locking the table, a clamping device is needed. Known examples of such clamping devices include a braking device disclosed in Japan Patent Laid-Open No. 351219/1994 and a clamping device disclosed in Japan Patent Laid-Open No. 254735/1994.

The braking device disclosed in the Japan Patent Laid-Open No. 351219/1994 comprises rotating members provided to the table and adapted to roll along the track rail to move the table relative to the track rail; a braking member which is provided to the table and moved between a braking position where it engages the rolling members and a nonbraking position where it disengages from the rolling members; and a drive means to move the breaking member. A wedge member as the braking member is inserted between the track rail and the rolling members to brake the table.

The clamping device disclosed in the Japan Patent Laid-Open No. 254735/1994 has a construction, in which a block is secured to the underside of a table-which moves relative to the track rail-and a pair of stopper members are provided to the underside of the table mounted astride the track rail and are operated by turning a threaded lever to clamp the block to the track rail.

When the table is locked at an arbitrary position on the track rail for performing some work, the table is normally held immovable only by the braking force of the table driving device. Under the work environment where the table is subject to large impacts and vibrations, however, a sufficient locking force is not obtained only with the braking force of the table driving device. Conventional practice to deal with this situation involves increasing the rigidity of the driving device and therefore the braking force. Increasing the rigidity of the driving device, however, gives rise to a problem of an increased overall size of the apparatus. Further, when the track rail is arranged vertically so that the table can be moved up or down, a power failure will result in a loss of the braking force of the driving device used to hold the table at a desired position, causing the table to fall down. It is therefore necessary to use a clamping device to hold the table at a desired position on the track rail.

With the conventional braking device, however, because the rolling members protrude greatly in the width direction of the track rail, the addition of the clamping device will result in an increased size and a complex construction of the apparatus. Another problem with the conventional clamping device is that because the clamping device clamps the both sides of the track rail only with screws, the table may not be locked securely enough and may begin to slide depending on the fastening force. To reliably clamp the table therefore requires a large fastening force.

SUMMARY OF THE INVENTION

The object of this invention is to provide a linear motion clamping unit which can reliably hold a casing, unit secured to a table at an arbitrary position on a track rail to securely clamp the table to the track rail.

The present invention relates to a linear motion clamping unit which comprises: a track rail having sidewall surfaces; and a casing unit straddling the track rail and capable of being locked at an arbitrary position on the track rail; wherein the casing unit includes retainers having openings facing the sidewall surfaces of the track rail; rolling members held in the openings of the retainers and capable of rolling on the sidewall surfaces of the track rail; casings mounted astride the track rail in such a way as to enclose the retainers; wedge members installed in the casings and facing the sidewall surfaces of the track rail, the wedge members having inclined surfaces that produce a wedge action in the axial direction; elastic members held in the openings of the retainers to push the rolling members against the inclined surfaces; and actuators to move the retainers axially relative to the casing to bring the rolling members into and out of engagement with a lock portion formed by the inclined surfaces of the wedge members and the sidewall surfaces of the track rail.

The actuators are provided with springs that move the casing and the retainers axially relative to each other.

The linear motion clamping unit has elastic members installed in the openings of the retainers to give elasticity to the axial motion of the rolling members toward wall surfaces of the openings.

The retainers comprise first retainers and second retainers arranged in series on the track rail, and the inclined surfaces of the wedge members comprise first inclined surfaces for the first retainers and second inclined surfaces for the second retainers, with the first inclined surfaces and the second inclined surfaces inclined in opposite directions.

The actuators comprise a first actuator to move the first retainers relative to the casings to release the rolling members from the first inclined surfaces and a second actuator to move the second retainers relative to the casings to release the rolling members from the second inclined surfaces.

The casings are formed with mounting holes for mounting a table, and the track rail is formed with mounting holes for mounting it on a bed.

Side arms of the casings mounted astride the track rail have recesses on the inner side thereof which accommodate that side of the wedge members opposite the inclined surface side.

Springs are installed between the retainers and the casings to return the retainers to their original positions when the actuators are deenergized.

In the linear motion clamping unit of the above construction, when the actuator is deenergized, the retainer, in its process of returning to its original position, moves in an axial direction that produces a wedge effect, pressing the rollers in the openings of the retainer against the inclined surfaces by the force of the elastic members and forcing the rollers to engage in the lock portion formed by the inclined surface and the sidewall surfaces of the track rail. The wedge action locks the casing unit on the track rail in one axial direction of the track rail.

Because the linear motion clamping unit effects locking by utilizing the wedge effect produced between the plate-like wedge member and the sidewall surfaces of the track rail, it is possible to lock the casing unit on the track rail with a small locking force thus reliably locking the table secured to the casing unit even though the size of the unit is small.

Because the linear motion clamping unit can be moved freely along the length of the track rail by energizing the actuator and locked by deenergizing the actuator, it is possible to reliably hold at an arbitrary position on the track rail a variety of devices, such as table, secured to the casing unit. Even in applications where the track rail is arranged in a vertical direction, the linear motion clamping unit can prevent the devices on the casing unit from moving along or falling from the track rail in the event of a power failure or an electric system trouble. In this way, the unit can work as a safety device.

That is, because the locking of the casing unit by one of the retainers works only in one of the axial directions of the track rail, the casing unit can be unlocked from the track rail by moving the retainer in an axial direction away from the wedge to disengage the rolling members from the lock portion. The casing unit can be locked in both axial directions of the track rail by arranging a pair of retainers in the opposing relationship on the track rail so that the directions of movements of the rolling members by the actions of these two retainers are opposite.

When the actuator is energized, the rolling members are pulled out of the lock portion formed by the inclined surfaces of the wedge members and the sidewall surfaces of the track rail by the action of the retainers. The rolling members therefore are loosely fitted or able to roll to some extent, in the openings of the retainers between the sidewall surfaces of the track rail and the wedge members, allowing the casing unit to be moved in either longitudinal direction of the track rail.

Where first and second inclined surfaces, which are inclined in opposite directions, are provided, the casing unit can be locked in both longitudinal directions of the track rail by deenergizing both the first actuator and the second actuator. By energizing only one of the first and second actuators, it is possible to lock the linear motion clamping unit in only one direction of the track rail.

Although the linear motion clamping unit can be mounted directly to a table, it is preferred that the linear motion clamping unit be incorporated in a casing and that the table be mounted to the upper surface of the casing by using the mounting holes formed in the upper surface of the casing. When the linear motion clamping unit is incorporated in the casing, it is preferred that the side arms of the casing be formed with recesses on the inner side, into which the wedge members can easily be assembled.

Further, the actuators may preferably use solenoids because of their small size and small space requirement. Other forms of actuators such as air cylinders may also be adopted. Suitable elastic members include coil springs and leaf springs.

DETAILED DESCRIPTION OF THE EMBODIMENT

Figure 1:
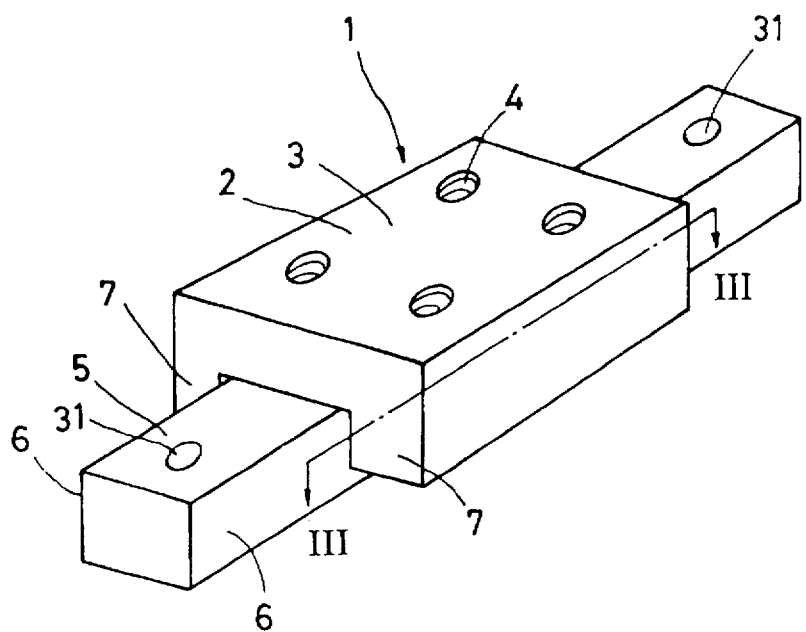
FIG. 1 is a perspective view of one embodiment of the linear motion clamping unit according to the present invention.

One embodiment of the linear motion clamping unit of this invention will be described by referring to the accompanying drawings.

This linear motion clamping unit has a track rail 5 and a casing unit 1 having side arms straddling the track rail 5. A casing 2 of the casing unit 1 has mounting holes 4 formed in its upper surface 3 for mounting a variety of devices such as table. The casing unit 1 and the table can also be mounted to a linear motion rolling guide unit, though not shown. The track rail 5 is formed with holes 31 for mounting on a base or the like (not shown).

The casing unit 1, as shown in FIG. 1, is mounted astride the track rail 5, which is elongate and formed rectangular in cross section. The casing unit 1 can be slid along the length or axis of the track rail 5 and can also be locked at a desired position on the rail. The track rail 5 is installed on a base, for example. While the track rail in the linear motion rolling guide unit has raceway grooves (not shown) formed in the longitudinally extending sidewall surfaces 6 along which the rolling members such as balls roll, the sidewall surfaces 6 of the track rail 5 may be formed smooth as shown in FIG. 1 because the track rail 5 does not need to have raceway grooves in the sidewall surfaces 6. When, however, the track rail 5 of the linear motion clamping unit is also used as the track rail for the linear motion rolling guide unit, it is formed with the raceway grooves.

The side arms 7 of the casing 2 each have a recess 8 formed on the inner side, in which is fitted a wedge member 9 that is a plate-like member and faces the corresponding sidewall surface 6 of the track rail 5. The wedge member 9 has inclined surfaces 10, 20 that are inclined with respect to the sidewall surface 6 of the track rail 5 and which exerts a wedge action in the axial direction. The inclined surfaces 10, 20 are a pair of first inclined surface 10 and second inclined surface 20 that tilt in the opposite directions.

Figure 3:
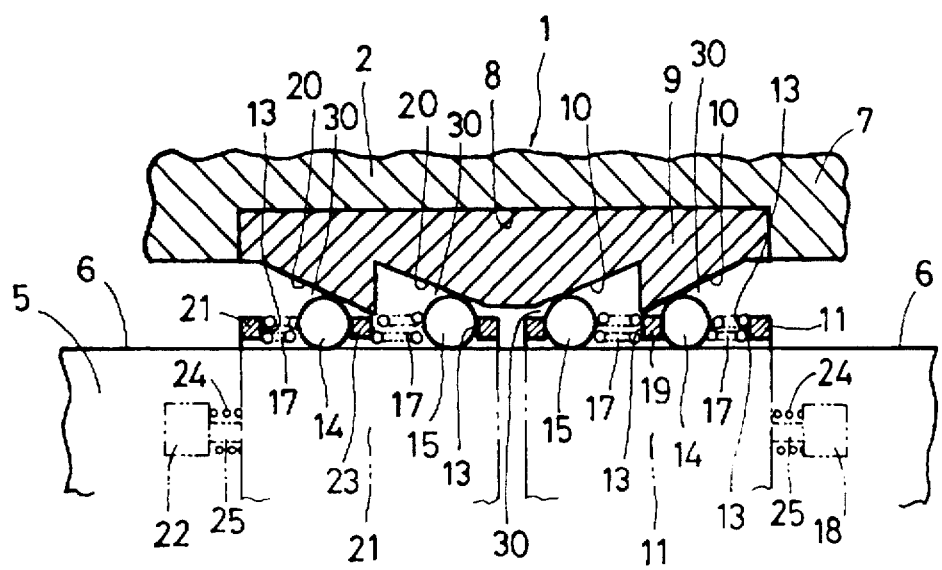
FIG. 3 is a partial cross-section of the linear motion clamping unit taken along the line III—III of FIG. 1.

Retainers 11, 21 include a first retainer 11 and a second retainer 21 arranged in series and mounted astride the track rail 5. The retainers 11, 21 have sleeve portions 19, 23 that are mounted astride the track rail 5 and face the sidewall surfaces of the track rail 5. Between the wedge member 9 and the sidewall surfaces 6 of the track rail 5 are arranged the sleeve portions 19, 23 of the retainers 11, 21. The sleeve portion 19 of the first retainer 11 is arranged to face the inclined surface 10, and the sleeve portion 23 of the second retainer 21 is arranged to face the inclined surface 20. The retainers 11, 21 each have two openings 13 in each side arm 10 or sleeve portion 19, 23 facing the longitudinally extending sidewall surfaces 6 of the track rail 5. In each opening 13 is arranged one roller 14, 15, which forms rolling members that roll along the longitudinally extending sidewall surfaces 6 of the track rail 5. Also arranged in each opening 13 is a leaf spring 16 as an elastic member that urges the roller 14, 15 toward the wall surface of the opening 13. That is, the leaf spring 16 is installed in the openings 13 of the retainers 11, 21 to hold the rollers 14, 15 against the wall surface of the openings 13 so that the rollers 14, 15 is elastically movable in the axial direction. The leaf spring 16 may be replaced with a coil spring 17 as the elastic member, as shown in FIG. 3. The number of openings in the retainers 11, 21, the number of rollers 14, 15 and the number of inclined surfaces 10 are related to one another.

Figure 4:
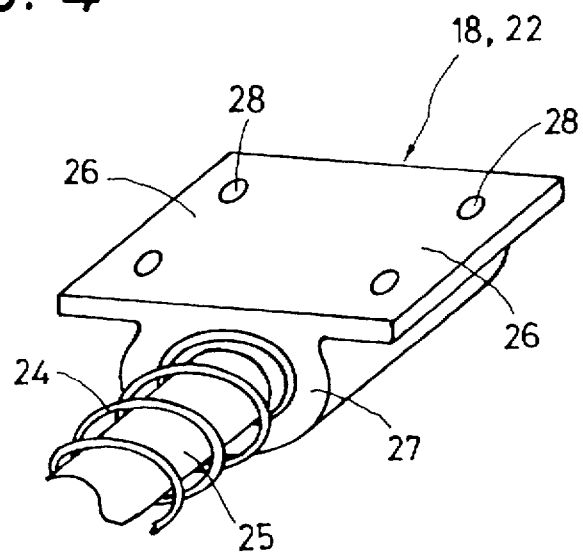
FIG. 4 is a perspective view of an actuator assembled into the linear motion clamping unit.
Figure 5:
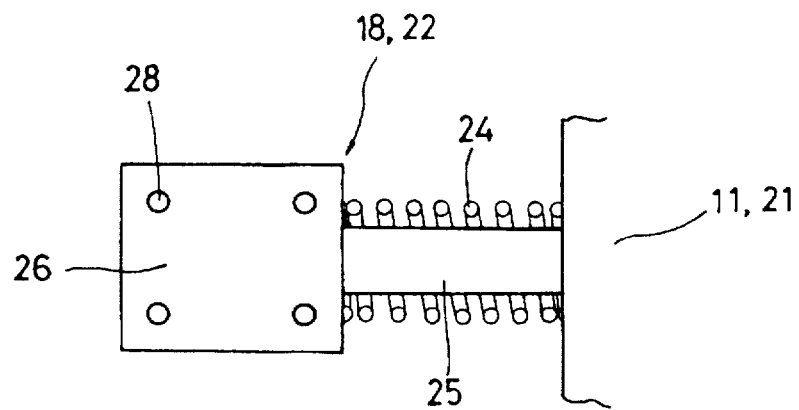
FIG. 5 is a schematic view of the actuator installed between a retainer and a casing.
Figure 6:
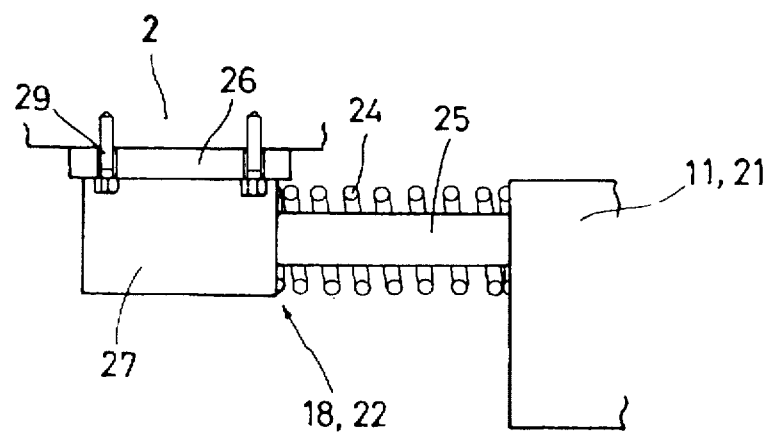
FIG. 6 is a schematic view of a structure for mounting the actuator to the retainer and the casing.
Figure 7:
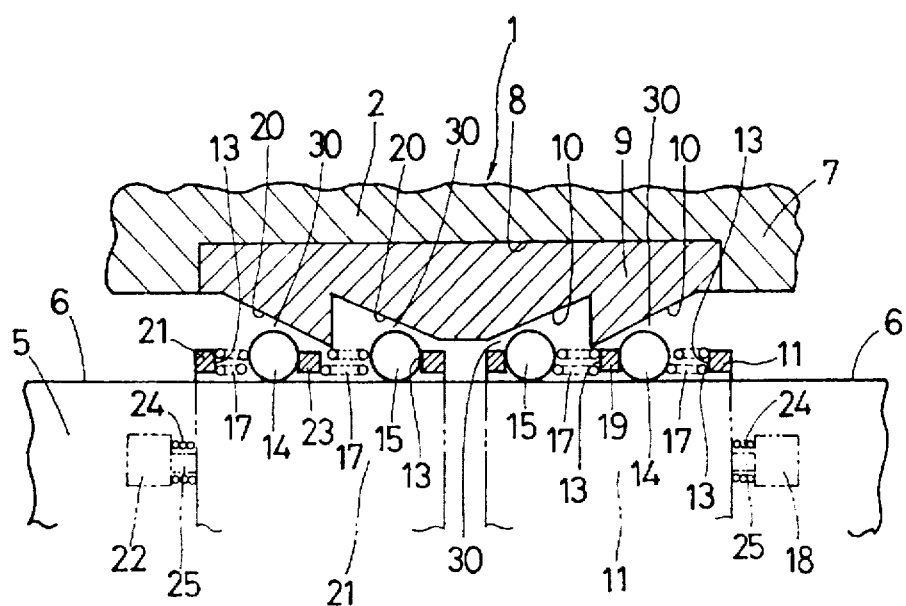
FIG. 7 shows the clamping unit with the solenoid energized.

To move the retainers 11, 21 relative to the casing 2 there are provided actuators 18, 22. The actuators 18, 22, as shown in FIG. 4, 5 and 6, comprise a mounting portion 26 having mounting holes 28 for fastening it to the casing 2 with bolts 29; an actuator body 27 formed integral with the mounting portion 26; and a rod portion 25 adapted to project and retract with respect to the actuator body 27. Sleeved over the rod portion 25 and interposed between the actuator body 27 and the retainer 11, 21 is a spring 24 which, when the actuator 18, 22 is in a non-activated state, extends the rod portion 25 from the actuator body 27. The spring 24 moves the casing 2 and the retainer 11, 21 relative to each other. That is, when the actuator 18, 22 is not activated, the spring 24 moves the retainer 11, 21 axially with respect to the casing 2 thereby moving the rollers 14, 15 with respect to the casing 2.

The actuators 18, 22 can move the retainers 11, 21 relative to the casing 2 to push the rollers 14, 15 into a lock portion 30 formed by the inclined surfaces 10, 20 of the wedge member 9 and the sidewall surfaces 6 of the track rail 5 or to release them from the lock portion 30. The actuators 18, 22 include an actuator 18 for moving the first retainer 11 relative to the casing 2 in the longitudinal direction or axial direction of the track rail 5 and an actuator 22 for moving the second retainer 21 relative to the casing 2 in the longitudinal direction or axial direction of the track rail 5. Among the members that can be used as the actuators 18, 22 are solenoids, motors, hydraulic cylinders, and air cylinders, from which the most appropriate may be adopted according to the purpose and applications.

The linear motion clamping unit constructed as described above operates as follows. Our explanation concerns a case where solenoids are used as the actuators 18, 22.

In FIG. 3, when electric supply to the solenoid as the actuator 18 is stopped, the first retainer 11 moves axially toward the wedge by the force of the spring 24 to return to its original position with respect to the casing 2, with the result that the coil spring 17 generates an elastic force as it is pushed by the retainer 11. Then the coil spring 17 forces the roller 15 to enter into the lock portion 30 formed by the inclined surface 10 of the wedge member 9 installed in the casing 2 and the sidewall surfaces 6 of the track rail 5, thereby locking the casing 2 from moving to the right (FIG. 3) relative to the track rail 5.

Similarly, when the solenoid as the actuator 22 is deenergized, the second retainer 21 moves axially toward the wedge by the force of the spring to return to its original position relative to the casing 2. The coil spring 17 produces and elastic force as it is pushed by the retainer 21, causing the roller 15 to force itself into the lock portion 30 formed by the second inclined surface 20 of the wedge member 9 installed in the casing 2 and the sidewall surfaces 6 of the track rail 5. This locks the casing 2 from moving to the left (FIG. 3) with respect to the track rail 5. As a result, the casing unit 1 cannot move along the length of the track rail 5 in either direction and therefore is locked or fixed at an arbitrary axial position on the track rail 5.

When the solenoid of the actuator 18 is energized, the first retainer 11 is pulled away from the casing 2, with the result that the roller 14, 15 is pushed by the sidewall of the opening 13 of the retainer 11 and released from the lock portion 30 formed by the inclined surface 10. There is no longer the wedge action of the roller 14, 15 on the inclined surface 10, unlocking the casing 2 from the track rail 5. In this state, the casing 2 remains locked in the left direction of FIG. 3 and thus cannot be moved in that direction, but it can be moved to the right relative to the track rail 5. Next, when the solenoid of the actuator 22 is energized, the second retainer 21 is pulled away from the casing 2, pushing the roller 14, 15 by the sidewall of the opening 13 of the retainer 21 to release the roller 14, 15 from the lock portion 30 of the second inclined surface 20. As a result, the wedge action on the inclined surface 20 by the roller 15 is eliminated, unlocking the casing 2 from the track rail 5. Now, the casing 2 of the linear motion clamping unit 1 can be moved along the length of the track rail 5 is either direction.

Because this linear motion clamping unit is locked when the solenoid is deenergized, the casing 2 can be locked on the track rail 5 immediately in the event of a power failure or a trouble in the electric system. Therefore, in applications where the track rail 5 is arranged vertically so that the devices such as a table secured to the casing 2 can be moved up or down, the casing unit 1 can be reliably locked to the track rail 5, preventing the table secured to the casing unit 1 from a falling during a power failure. In other words, this locking mechanism serves as a safety device.

In the above embodiment, the casing unit 1 is provided with two sets of retainer and actuator so that it can be locked in both longitudinal directions of the track rail. When the casing unit needs to be locked in only one longitudinal direction of the track rail, it is only necessary to provide one of the inclined surfaces 10 and 20 for the wedge member 9 and the corresponding set of retainer and actuator.

In the above embodiment, the first and second retainers 11, 21 are moved relative to the casing toward each other to bring the rollers 14, 15 into engagement with the lock portion 30. If the directions of the inclined surfaces 10, 20 of the wedge member 9 are reversed, the engagement of the rollers 14, 15 into the lock portion 30 can be effected by moving the retainers 11, 21 away from each other. Further, the above embodiment locks the casing unit on the track rail when the actuator is deenergized, by using the force of a spring to move the rolling members such as rollers and, when the actuator is energized, unlocks the casing unit. It is also possible to lock the casing unit by energizing the actuator to move the rolling members and unlock the casing unit by deenergizing the actuator.

Figure 2:
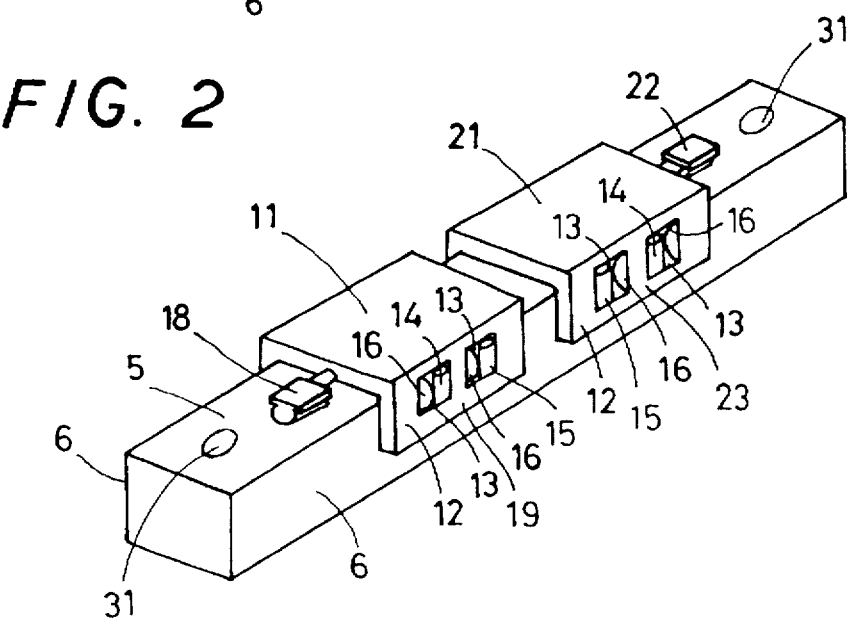
FIG. 2 is a perspective view of the linear motion clamping unit of FIG. 1 with a casing removed.

Further, the above embodiment has been described to use the casing unit 1 which incorporates the retainers 11, 21, rollers 14, 15, coil springs 17, wedge members 9, springs 25 and actuators 18, 22 into the casing 2. It is also possible to directly mount the table to the retainers 11, 21 shown in FIG. 2 and to install the wedge members and actuators to the table. In this case, the table doubles as the casing. Furthermore, although in the above embodiment, the linear motion clamping unit has been described to be a separate construction from the linear motion rolling guide unit, they may be formed integral as one structure. The linear motion clamping unit may also be constructed to straddle the track rail of the linear motion rolling guide unit and to be able to be locked on the track rail.

What is claimed is:

1. A linear motion clamping unit comprising:
a track rail having sidewall surfaces; and
a casing unit straddling the track rail and capable of being locked at an arbitrary position on the track rail;

wherein the casing unit includes:
   retainers having openings facing the sidewall surfaces of the track rail;
   rolling members held in the openings of the retainers and capable of rolling on the sidewall surfaces of the track rail;
   casings mounted astride the track rail in such a way as to enclose the retainers;
   wedge members installed in the casings and facing the sidewall surfaces of the track rail, the wedge members having inclined surfaces that produce a wedge action in the axial direction; and
   actuators to move the retainers axially relative to the casings to bring the rolling members into and out of engagement with lock portions formed by the inclined surfaces of the wedge members and the sidewall surfaces of the track rail.

2. A linear motion clamping unit according to claim 1, wherein the actuators are provided with springs that move the casing and the retainers axially relative to each other.

3. A linear motion clamping unit according to claim 1, further comprising elastic members installed in the openings of the retainers to give elasticity to the axial motion of the rolling members toward wall surfaces of the openings.

4. A linear motion clamping unit according to claim 1, wherein the retainers comprise first retainers and second retainers arranged in series on the track rail, and the inclined surfaces of the wedge members comprise first inclined surfaces for the first retainers and second inclined surfaces for the second retainers, with the first inclined surfaces and the second inclined surfaces inclined in opposite directions.

5. A linear motion clamping unit according to claim 4, wherein the actuators comprise a first actuator to move the first retainers relative to the casings to release the rolling members from the first inclined surfaces and a second actuator to move the second retainers relative to the casings to release the rolling members from the second inclined surfaces.

6. A linear motion clamping unit according to claim 1, wherein the casings are formed with mounting holes for mounting a table.

7. A linear motion clamping unit according to claim 1, wherein the track rail is formed with mounting holes for mounting it on a bed.

8. A linear motion clamping unit according to claim 1, wherein side arms of the casings mounted astride the track rail have recesses on the inner side thereof which accommodate those sides of the wedge members opposite the inclined surface sides.

9. A linear motion clamping unit according to claim 1, wherein springs are installed between the retainers and the casings to return the retainers to their original positions when the actuators are deenergized.

\* \* \* \* \*